C. Warren,
Reciprocating Saw Mill.
No. 103,261. Patented May 17, 1870.
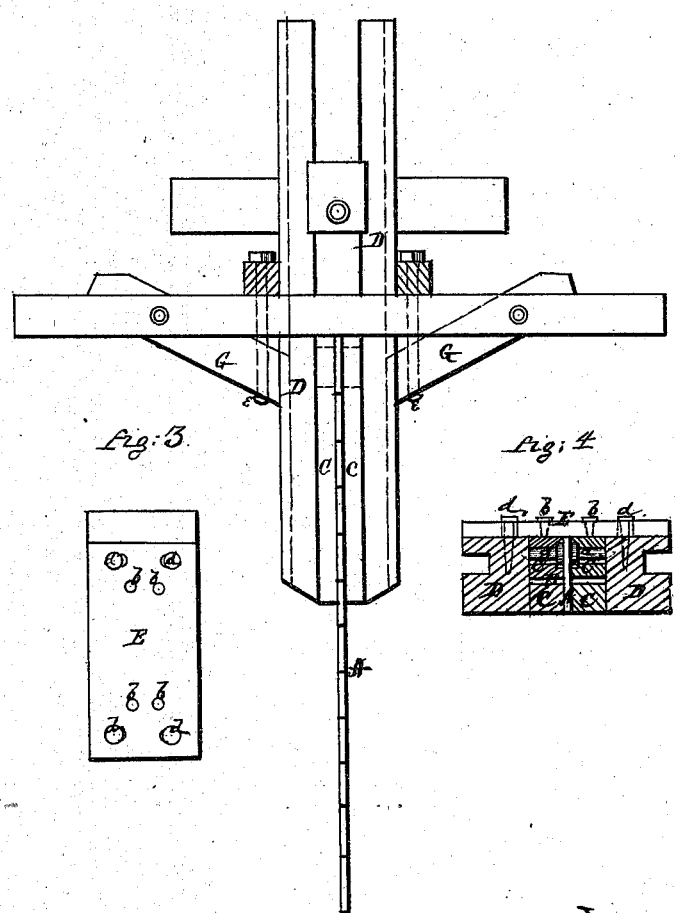
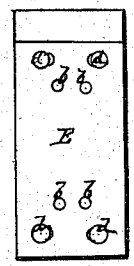
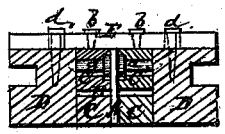
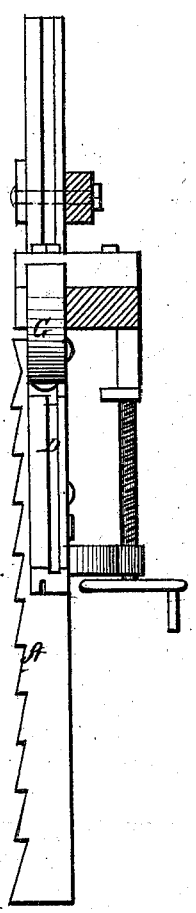
Witnesses
Arthur A. Yeatman
C. L. Evert
Inventor
Chas. Warren
per
Alexander T. Mason
Attys.

United States Patent Office.

CHARLES WARREN, OF CENTRE GROTON, CONNECTICUT.

Letters Patent No. 103,261, dated May 17, 1870.

IMPROVEMENT IN SAW-MILLS.

The Schedule referred to in these Letters Patent and making part of the same

*To all whom it may concern:*

Be it known that I, CHARLES WARREN, of Centre Groton, in the county of New London and in the State of Connecticut, have invented certain new and useful Improvements in Gate for Saw-Mills; and do hereby declare that the following is a full, clear, and exact description thereof, reference being had to the accompanying drawings and to the letters of reference marked thereon making a part of this specification.

The nature of my invention consists in the construction and arrangement of a gauge or gate for saw-mills, as will be hereinafter fully set forth.

In order to enable others skilled in the art to which my invention appertains to make and use the same, I will now proceed to describe its construction and operation, referring to the annexed drawing, in which—

Figure 1 is a front view, and
Figure 2 is a side view of my gate.
Figure 3 is a view of a back plate used in regulating the gauge-slide; and
Figure 4 is horizontal section of the saw and gauge-slides.

A represents the saw, in the upper end of which is cut a slot.

Across this end of the saw is inserted transversely another piece of saw-plate B, having a like slot cut so as to fit in the slot or gain cut in the saw, and set down so as to clinch the saw over it to hold it firm and extending at right angles across the saw a sufficient distance on each side to run between two gauge-slides, of a thickness equal at least to the projection of said piece across the saw-plate.

On each side of the saw A, I place the gauge-slides C C', one, C', back, and the other, C, forward of the transverse piece B, so that said piece will slide up and down between them, and said gauge-pieces to be of a width to extend to the front and back edge of the saw as far as desired.

The gauge-pieces C C' are covered with a timber, D, placed back of them on each side, which timber has a groove cut in the back edge, and there a piece of plank, E, is put on and bolted firmly to said timbers and covering the back edge of the saws.

The front gauge-pieces C C are firmly secured to the beams D D, while the back gauge-pieces C' C' are attached by means of bolts, *a a*, passing through elongated slots in said pieces, so that they can set up close to the cross-head B on the saw by means of the set-screws *b b*, which pass through the back covering E.

This covering E is attached to the beams D D by means of bolts *d d*, which pass through slots in the covering, so as to give the slides a chance to set up to the saw, by means of the screws *e e* in the outer braces G G, said braces being provided with a tongue in their inner ends which fit in the grooves on the outer edges of the beams D D.

This saw-gauge or gate, when so constructed, is raised or lowered to adapt it to any sized log by means of a screw and braces, as shown in fig. 2, and it supports or stiffens the saw throughout the whole length of said gauge and prevents any spring or bend.

I am aware that there are movable gates which are raised or lowered to adapt them to different logs, but these do not stiffen the saw, having a bearing of only a few inches, whereas my improvement bears its whole length, and the saw, sliding through it, must necessarily run true and firm.

Having thus fully described my invention,
What I claim as new, and desire to secure by Letters Patent, is—

1. The combination of the slides C C', beams D D, back E, and braces G G, all constructed and operating substantially as and for the purposes herein set forth.

2. The arrangement, with the slides C C', beams D D, back E, and braces G G, of the cross-head B, saw A, bolts *a a*, *d d*, and *e e*, and set-screws *b b*, all substantially as set forth.

In testimony that I claim the foregoing, I have hereunto set my hand this 14th day of March, 1870.

CHARLES WARREN.

Witnesses:
 D. A. DABOLL,
 ROBERT H. COOLEY.